E. SCHNEIDER.
GUN MOUNTED ON WHEELED CARRIAGES.
APPLICATION FILED JULY 20, 1920.

1,358,657.

Patented Nov. 9, 1920.
2 SHEETS—SHEET 1.

Inventor
Eugene Schneider
By Marks, Cameron, Lewis & Kirkam
attorneys

E. SCHNEIDER.
GUN MOUNTED ON WHEELED CARRIAGES.
APPLICATION FILED JULY 20, 1920.

1,358,657.

Patented Nov. 9, 1920.
2 SHEETS—SHEET 2.

Inventor
Eugene Schneider
By Munn Cameron, Lewis & Kerkam,
attorneys

UNITED STATES PATENT OFFICE.

EUGENE SCHNEIDER, OF PARIS, FRANCE, ASSIGNOR TO SCHNEIDER & CIE., OF PARIS, FRANCE, A LIMITED JOINT-STOCK COMPANY OF FRANCE.

GUN MOUNTED ON WHEELED CARRIAGES.

1,358,657.  Specification of Letters Patent.  Patented Nov. 9, 1920.

Original application filed October 24, 1919, Serial No. 333,101. Divided and this application filed July 20, 1920. Serial No. 397,631.

*To all whom it may concern:*

Be it known that I, EUGENE SCHNEIDER, a citizen of the Republic of France, and a resident of Paris, France, have invented new and useful Improvments in Guns Mounted on Wheeled Carriages, which invention is fully set forth in the following specification.

Wheeled gun carriages are known which are so constructed as to provide a limited range of lateral movement of the carriage on the axle between the supporting wheels for the purpose of varying the training of the gun. In such carriages, the lateral movement is obtained by the operation of a screw journaled in the carriage and working in a nut fixed to the wheeled axle to slide the carriage along the same in either direction.

According to the present invention, the head of the gun carriage, instead of sliding upon the wheeled axle, is slidably mounted on a cross-piece or auxiliary axle elastically supported on the main or wheeled axle. Interposed between the main and auxiliary axle are springs to carry the gun and its carriage during transport, and means are provided for connecting the carriage directly with the main axle during firing so that the shock of discharge will be transmitted directly from the carriage to the main axle without the interposition of the suspension springs.

In my copending application filed October 24, 1919, Serial No. 333,101, several constructional forms of this invention are shown and described, and the present application is a division of the earlier application, being directed to one of the constructional forms therein disclosed.

In the accompanying drawings, in which similar reference characters designate corresponding parts—

Figure 1:
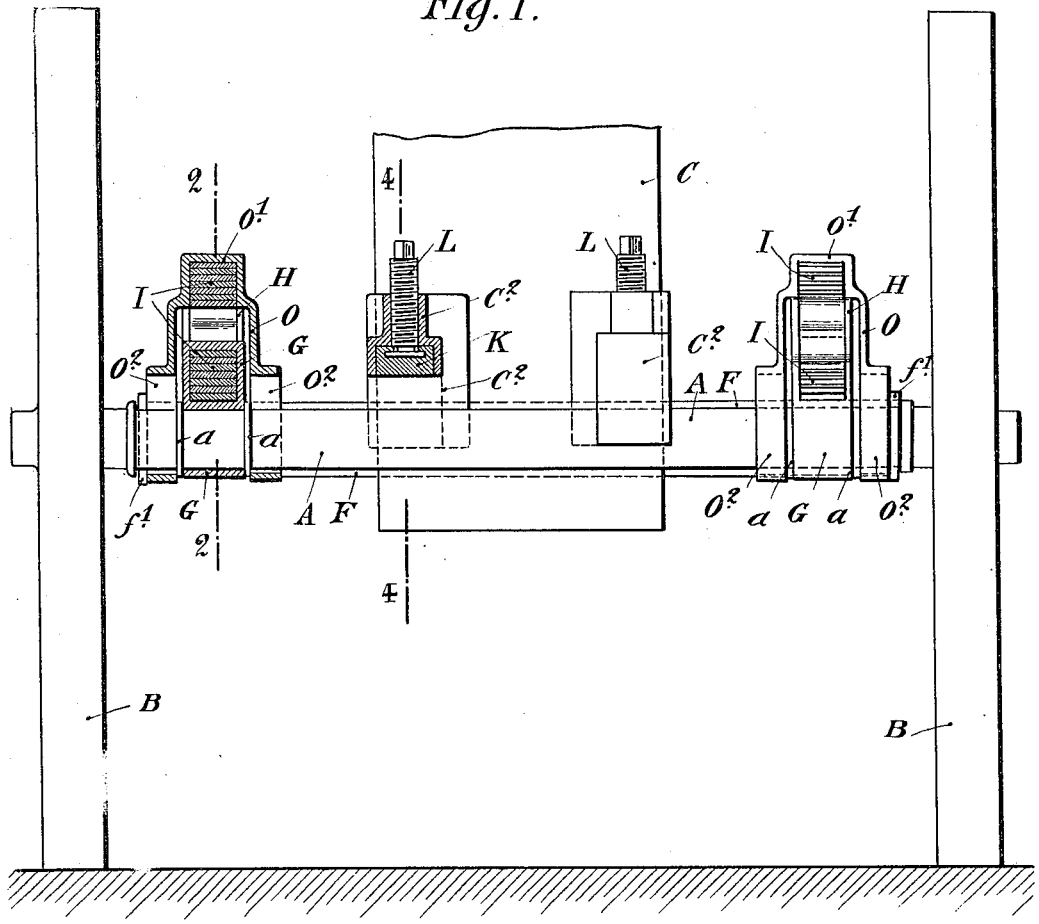
Figure 1 is a view, partly in elevation and partly in vertical section, on the line 1—1 of Fig. 2, of a constructional form of the invention.
Figure 3:
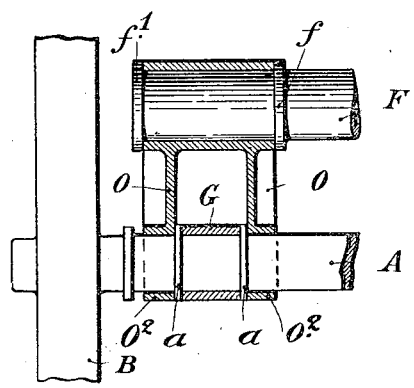
Fig. 3 is a horizontal section on the line 3—3 of Fig. 2.

According to this constructional form of the invention, the straight main axle A is carried by the wheels B in the usual manner, and supported in offset parallel relation to such axle and approximately in the same horizontal plane is the straight auxiliary or false axle F, on which is mounted the carriage C to slide laterally thereon. On each end of the auxiliary axle is journaled a bracket O, held against lateral movement thereon by the collar $f$, $f'$ of the axle. Seated in the socket O' in the top of each bracket in the upper bow of the leaf spring I, the two bows of which are connected at their ends by the links H. The lower bow of the spring is seated in a socket of the block G mounted on the main axle between the collars $a$, $a$ of the axle, the collars preventing lateral movement of the block on the axle. The main axle is rectangular in cross-section and the block G, fitted thereon, is prevented from turning. The block so held normally tends to hold the spring upright. Forming part of the bracket O and on opposite sides of the same are the stirrups $O^2$ engaging the main axle to limit the vertical play of the bracket and attached spring relatively to the axle. The stirrups have a sliding engagement with the opposite vertical sides of the axle which tends to hold the bracket and the attached spring in upright position. When the springs I are free to act, they provide an elastic suspension for the carriage that can be utilized in transport of the gun.

Means are provided for guiding the carriage C in its vertical movement relatively to the main axle A while suspended by the springs I during transport, and also for rigidly connecting the carriage to the main axle during firing so that the shock of discharge will be transmitted directly from the carriage to the main axle without the interposition of the springs.

Fixed to opposite sides of the carriage C are the cheek-blocks $C^2$ recessed at their lower ends to form guide-jaws to engage the opposite flat sides of the main axle A. As the carriage is moved along the auxiliary axle F, the cheek-blocks slide along the main axle. The recesses in the cheek-blocks are sufficiently deep to permit a limited upward movement therein of the main axle as the wheels B ride over obstructions in the road during transport, the interposed springs I carrying the load and yielding to the movement of the main axle. While the cheek-blocks permit relatively vertical movement, to a limited extent, between the carriage and main axle, yet they maintain such parts in their proper spaced relation and the two axles in approximately the same horizontal plane during such movement. Without these cheek-plates, the carriage and brackets I would buckle downward on the auxiliary axle F until the main axle A jammed against the carriage.

In the upper ends of the recesses in the cheek-blocks C² are the bearing plates K swiveled to the lower ends of the bolts L threaded through the upper ends of the cheek-blocks. By turning down the bolts L, the plates can be forced onto the main axle A to form a direct bearing for the carriage on the axle. With the plates so adjusted, the springs I will be relieved of the load and, during firing, the shock of discharge will be transmitted directly from the carriage to the main axle. By turning the bolts L upward, the bearing plates are raised from the main axle and the carriage will be suspended by the springs I for transport purposes.

The cheek-blocks C² on the carriage and engaging the main axle A and the brackets O on the auxiliary axle and also engaging the main axle form traction connections between the carriage and main axle, so that a pulling or pushing force imparted to the carriage will be transmitted to the main axle and its supporting wheels.

Figure 2:
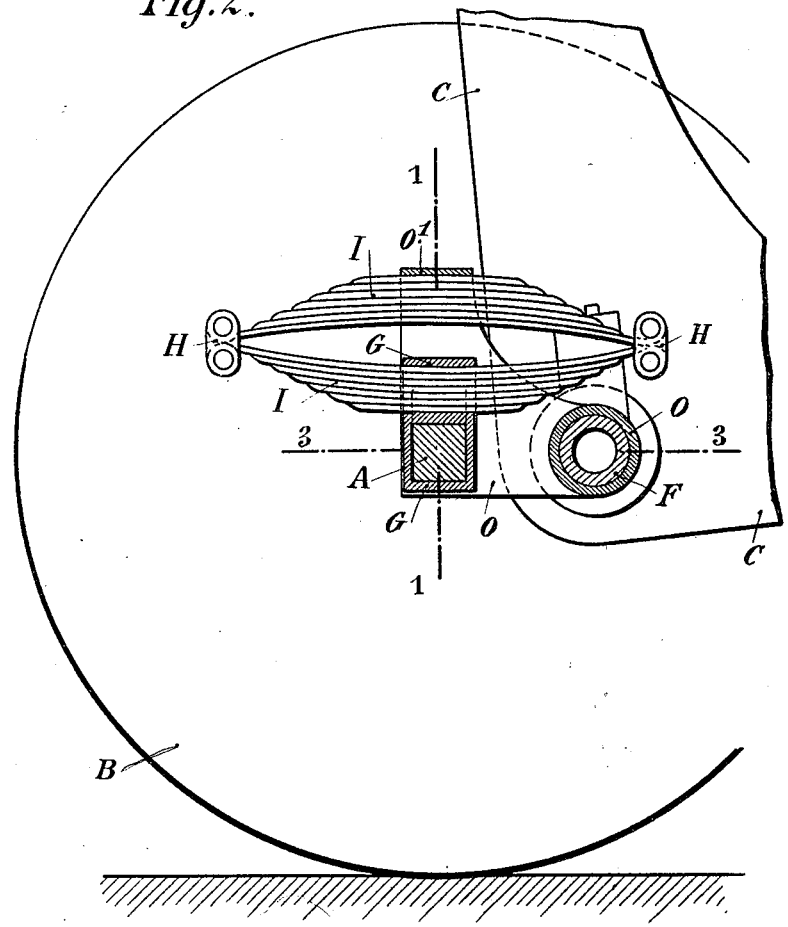
Fig. 2 is a vertical section on the line 2—2 of Fig. 1.
Figure 4:
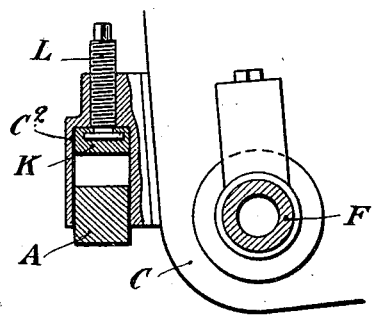
Fig. 4 is a vertical section on the line 4—4 of Fig. 1.

In placing the gun for firing, the tail of the carriage trail (not shown) is pivoted to the ground in the usual manner. Preliminarily to firing, the bolts L are turned down to force the plates K onto the main axle A to form a direct bearing between the carriage and the main axle and thereby relieve the springs of the load. In training the gun, the head of the carriage is moved along the auxiliary axle by a screw (not shown herein, but disclosed in Figs. 2 and 4 of the parent case) journaled in the carriage and engaging a nut on the auxiliary axle. When the head of the carriage is adjusted on the auxiliary axle, the carriage as a whole will pivot on the anchored tail of the trail. As the gun is so trained, the movement of the carriage head will cause a slight shifting in the position of the main axle relatively to the trail pivot and the supporting wheels will turn slightly to accommodate this shifting of the main axle. Preliminarily to transport, the carriage is moved to a midway position on the auxiliary axle and the bolts L are turned upward to raise the plates K from the main axle so that the load will be suspended by the springs.

What is claimed is:—

1. In a gun mounting, a wheeled main axle, an auxiliary axle yieldingly supported on the main axle in offset parallel relation thereto and approximately in the same horizontal plane with said main axle, a carriage slidable on the auxiliary axle for training the gun, and adjustable means operative to form a direct bearing for the carriage on the main axle to relieve the auxiliary axle of the load and to transmit the shock of discharge directly from the carriage to the main axle.

2. In a gun mounting, a wheeled main axle, an auxiliary axle yieldingly supported on the main axle in offset parallel relation thereto and approximately in the same horizontal plane with said main axle, a carriage slidable on the auxiliary axle for training the gun, cheek-blocks on the carriage having jaws engaging opposite sides of the main axle to slide along the main axle as the carriage slides along the auxiliary axle, said cheek-plates operating to hold the main and auxiliary axles approximately in the same horizontal plane, the jaws of said cheek-plates having a limited vertical play on the main axle to accommodate the relatively vertical movements between the two axles, and adjustable means operative to form a direct bearing for the carriage on the main axle to relieve the auxiliary axle of the load and to transmit the shock of discharge directly from the carriage to the main axle.

3. In a gun mounting, a wheeled main axle, an auxiliary axle yieldingly supported on the main axle in offset parallel relation thereto and approximately in the same horizontal plane with said main axle, a carriage slidable on the auxiliary axle for training the gun, cheek-blocks on the carriage having jaws engaging opposite sides of the main axle to slide along the main axle as the carriage slides along the auxiliary axle, said cheek-plates operating to hold the main and auxiliary axles approximately in the same horizontal plane, the jaws of said cheek-plates having a limited vertical play on the main axle to accommodate the relatively vertical movements between the two axles, bearing plates adjustably mounted in the cheek-plates between the jaws thereof to be adjusted to bear on the main axle to relieve the auxiliary axle of the load and to transmit the shock of discharge directly from the carriage to the main axle.

4. In a gun mounting, a wheeled main axle, an auxiliary axle. means for holding the auxiliary axle in offset parallel relation with the main axle and approximately in the same horizontal plane, a carriage having its head slidable on the auxiliary axle for training the gun, spring mechanism interposed between the two axles to suspend the carriage for transport, and adjustable means operative to form a direct bearing for the carriage on the main axle to transmit the shock of discharge directly from the carriage to the main axle without the interposition of the spring mechanism.

5. In a gun mounting, a wheeled main axle, an auxiliary axle, mechanism providing a limited vertical play for holding the auxiliary axle in offset parallel relation with the main axle and approximately in the same horizontal plane, a carriage having its head slidable on the auxiliary axle for training the gun, spring mechanism interposed between the two axles to suspend the carriage for transport, the expansive action of said springs being controlled by the limited play of said holding mechanism, and adjustable means operative to form a direct bearing for the carriage on the main axle to relieve the springs of the load and to transmit the shock of discharge directly from the carriage to the main axle.

6. In a gun mounting, a wheeled main axle, an auxiliary axle, mechanism providing a limited vertical play for holding the auxiliary axle in offset parallel relation with the main axle and approximately in the same horizontal plane, a carriage having its head slidable on the auxiliary axle for training the gun, spring mechanism interposed between the two axles to suspend the carriage for transport, the expansive action of said springs being controlled by the limited play of said holding mechanism, cheek-plates on the carriage having a vertical sliding engagement with the main axle to maintain said axle in its spaced relation relatively to the carriage and to the auxiliary axle, and adjustable means operative to form a direct bearing for the carriage on the main axle to relieve the springs of the load and to transmit the shock of discharge directly from the carriage to the main axle.

7. In a gun mounting, a wheeled main axle, an auxiliary axle, mechanism providing a limited vertical play for holding the auxiliary axle in offset parallel relation with the main axle and approximately in the same horizontal plane, a carriage having its head slidable on the auxiliary axle for training the gun, spring mechanism interposed between the two axles to suspend the carriage for transport, the expansive action of said springs being controlled by the limited play of said holding mechanism, cheek-plates on the carriage having a vertical sliding engagement with the main axle to maintain said axle in its spaced relation relatively to the carriage and to the auxiliary axle, bearing plates vertically adjustable in the cheek-plates to bear upon the main axle to relieve the springs of the load and to transmit the shock of discharge directly from the carriage to the main axle.

8. In a gun mounting, a wheeled main axle, an auxiliary axle, brackets mounted at one end on the auxiliary axle, stirrups on the other end of the brackets having a limited sliding engagement with the main axle, said brackets and stirrups holding the two axles in offset parallel relation, a carriage slidable along the auxiliary axle, springs interposed between the stirrups and the main axle to carry the load of the carriage during transport, cheek-plates on the carriage having a sliding engagement with the main axle to move along said axle and also having a limited vertical play on said main axle to permit relatively vertical movement between the carriage and the main axle, and bearing plates vertically adjustable in the cheek-plates to bear on the main axle to relieve the springs of the load of the carriage during firing and to transmit the shock of discharge directly from the carriage to the main axle.

In testimony whereof I have signed this specification.

EUGENE SCHNEIDER.

Witnesses:
　ANDRÉ MOSTICKER,
　CLEMENT S. EDWARDS.